United States Patent Office 3,637,617
Patented Jan. 25, 1972

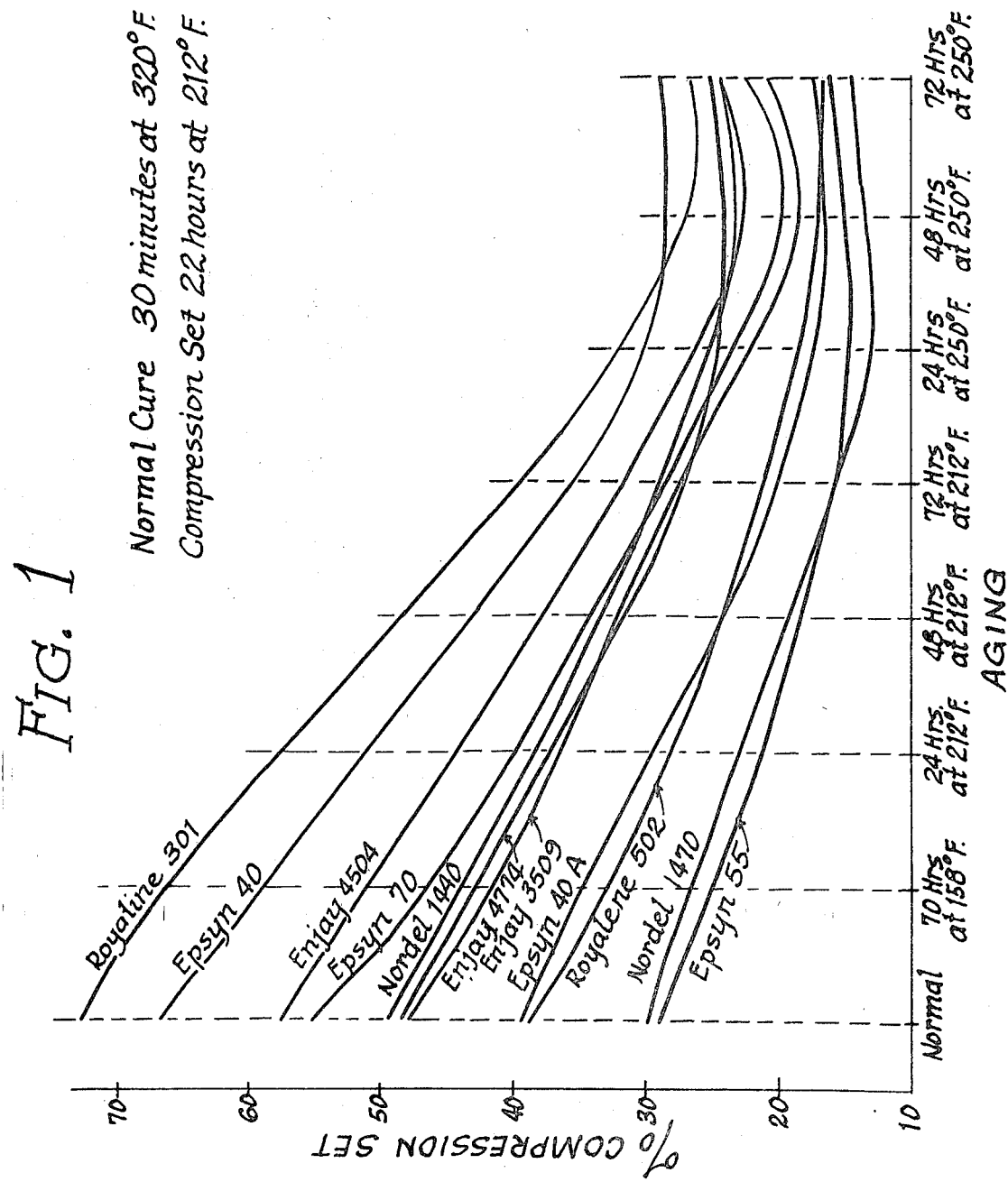

3,637,617
MINIMIZING COMPRESSION SET OF CURABLE RUBBERS
Kenneth H. Wirth, Baton Rouge, La., assignor to Copolymer Rubber & Chemical Corporation, Baton Rouge, La.
Filed Sept. 8, 1969, Ser. No. 855,940
Int. Cl. C08f 15/04
U.S. Cl. 260—80.78      8 Claims

ABSTRACT OF THE DISCLOSURE

The method for reducing compression set of curable elastomeric materials comprising heating the cured elastomer to a temperature within the range of 200° to 400° F. for a time within the range of more than 72 hours at 212° F. to more than 1 hour at 400° F. and in which the cured elastomer is preferably an EPDM rubber having at least five C=C groups per 1000 carbon atoms before cure.

---

This invention relates to the production of sulfur vulcanizable or curable elastomers characterized by reduced compression set and it relates more particularly to the treatment of sulfur vulcanizable and curable EPDM rubbers having low compression set.

The invention will be described with reference to sulfur vulcanizable and curable EPDM rubbers. Briefly described, the term "sulfur vulcanizable and curable EPDM rubbers," with which this invention finds preferable use, refers to rubbers formed by interpolymerization of a monomeric mixture containing ethylene, at least one higher alpha-monoolefin containing 3-16, and preferably 3-10, carbon atoms, as represented by propylene, butylene, pentylene and the like, and at least one monomeric compound having two or more unsaturated carbon to carbon linkages, such as a bridged or straight chained polyene, as represented by 1,4-hexadiene and the like straight chained dienes containing from 2-18 carbon atoms, as described in U.S. Pat. No. 2,933,480, or a cyclic polyene, such as dicyclopentadiene (DCP), 1,5-cyclooctadiene, 2-methyl(1-8, 4-9)tetrahydroindene and the like, but in which the polyene is preferably selected of a bridged ring polyene, such as an alkenyl-2-norbornene, represented by 5-propionyl-2-norbornene, 5-butenyl-2-norbornene and the like, and more preferably an alkylidene-2-norbornene such as 5-methylene-2-norbornene, 5-ethylidene-2-norbornene and other 5-alkylidene-2-norbornenes in which the alkylidene group has from 2-10 carbon atoms.

Other bridged ring hydrocarbons include polyunsaturated derivatives of bicyclo(2,2,2)octa-2,5-diene, polyunsaturated derivatives of bicyclo(3,2,1)octane, polyunsaturated derivatives of bicyclo(3,3,1)nonane, and polyunsaturated derivatives of bicyclo(3,3,2)nonane. At least one double bond is present in a bridged ring of the above compound and at least one other double bond is present in a bridged ring or in a side chain. Further examples of polyunsaturated bridged ring hydrocarbons and in the preparation of EPDM rubbers therefrom are described in U.S. Pats. No. 2,933,480, No. 3,093,620, No. 3,093,621 and No. 3,211,709. Halogen substituted bridged ring compounds, and especially chlorine substituted bridged ring compounds, may be present in the monomeric mixture to be polymerized, examples of which are disclosed in U.S. Pats. No. 3,220,988 and No. 3,222,330.

The EPDM elastomers usually contain ethylene and the other monoolefin, such as propylene, in the mole ratio of 80:20 and 20:80 with the bridged ring hydrocarbon interpolymerized in an amount to provide an unsaturation level greater than 1.5 C=C groups per 1000 carbon atoms of the elastomer, and preferably 2.5–10 and more preferably 5–30 effective C=C groups per 1000 carbon atoms.

In instances where it is desired to prepare a tetrapolymer or a polymer containing more than four different monomers, one or more of the alpha-monoolefins containing 4–16 and preferably 4–10 carbon atoms may be substituted for an equal molecular amount of bound propylene in the composition previously described. Such fourth monomer, when present, will normally be employed in an amount within the range of 5–20 mole percent, but smaller amounts to 1 mole percent can be used.

The polymerization is usually carried out in a solvent system in the presence of a Ziegler type catalyst. The polymerization solvent may be any suitable inert or saturated hydrocarbon which is liquid and relatively nonviscous under reaction conditions. Examples of satisfactory hydrocarbon solvents include open chain saturated hydrocarbons containing 5–8 carbon atoms, as represented by hexane; aromatic hydrocarbons, preferably hydrocarbons containing a single benzene nucleus, such as benzene or toluene; and saturated cyclic hydrocarbons which have boiling ranges approximating those for the open chain and aromatic hydrocarbons described, and preferably saturated cyclic hydrocarbons containing 5 or 6 carbon atoms in the ring structure. The solvent may be a mixture of one or more of the foregoing hydrocarbons, such as a mixture of aliphatic and naphthenic hydrocarbons having approximately the same boiling range as hexane.

As the Ziegler type catalyst, use can be made of any suitable Ziegler type catalyst known to the prior art, such as described in U.S. Pats. No. 2,933,480, No. 3,093,620, No. 3,093,621, No. 3,211,709 and No. 3,113,115.

The preferred Ziegler type catalyst for use in the preparation of EPDM rubbers comprises the combination of a vanadium compound and an alkyl aluminum halide. Examples of suitable vanadium compounds include vanadium trichloride, vanadium tetrachloride, vanadium oxychloride and vanadium acetylacetonate. Activators which are preferred include alkyl aluminum chloride, having the general formulae $R_1AlCl_2$ and $R_2AlCl$ and their corresponding sesquichlorides in which R is an organic group such as methyl, ethyl, propyl, butyl, isobutyl and the like. A catalyst prepared from methyl or ethyl aluminum sesquichloride and vanadium oxychloride is preferred with the optimum ratio usually within the range of 1 mole of vanadium oxychloride to 4–10 moles of alkyl aluminum sesquichloride to provide a ratio of aluminum to vanadium of 8:1 to 20:1.

The EPDM rubbers are prepared in a conventional manner as described in "The Introduction to Rubber Technology," by M. Morton, Reinhold Publishing Corporation, New York (1959); "Synthetic Rubber Technology," vol. I, by W. S. Penn, Maclaren and Sons, Ltd., London (1960); "Rubber, Fundamentals of Its Science and Technology," by J. LeBras, Chemical Publishing Company, Inc., New York (1957); and Linear and Stereoregular Addition Polymers, by N. G. Gaylord et al., Interscience Publishers, New York (1959).

Low compression set represents a very desirable characteristic for many uses to be made of EPDM elastomers. When measured by the standard ASTM compression set test, D-395-67, the compression set of commercially available EPDM elastomers varies from 90% to 30%, calculated as the percent deformation which remains after the compressive forces have been released from a set state and in which the value depends somewhat on the type of third polyunsaturated monomer of which the interpolymer is formed and the amount of such polyunsaturated third monomer as well as the compounding and conditions of cure. Lower compression set is secured with interpolymers formed of third monomers such as the 5-alkylidene-2-norbornenes, as represented by 5-ethylidene-2-norbornene, and in which the amount of such polyunsaturated monomer is increased to provide higher effective unsaturation levels in the uncured or unvulcanized elastomeric material.

It is an object of this invention to produce and to provide a method for producing sulfur vulcanizable and curable elastomers and preferably sulfur vulcanizable and curable EPDM interpolymers having reduced compression set.

It has been found, in accordance with an important concept of this invention, that the amount of set which is retained upon compression of a cured or vulcanized EPDM rubber is greatly reduced when the cured or vulcanized rubber is subjected to a post-heat treatment at a temperature within the range of 212° to 400° F. for a time ranging from a minimum of 70 hours at the lower temperature to a minimum of 1 hour at the higher temperature and, more specifically, for a time of at least 70 hours at 212° F., at least 24 hours at 250° F., at least 4 hours at 275°–300° F., at least 1–2 hours at 350° F. and at least 1 hour at 400° F. Heat treatment at a temperature in excess of 400° F. is undesirable because thermal breakdown of the rubber occurs before achieving a desirable reduction in compression set. Heat treatment at temperatures below 200° F. appears to afford little if any beneficial effect on compression set, even when continued over an impractical period of time.

While the mechanism or reactions responsible for reduction in compression set in response to heat treatment of the type described have not been established, it is believed that the activation of the rubber molecules over the period of time for heat treatment enables re-adjustment of the molecules to an oriented position without noticeable change in density or shape of the cured elastomer to provide an oriented rubber in which compression set is reduced to low levels by comparison with the cured or vulcanized rubber. It is also believed that compression set is somewhat dependent upon cross-linked density of the cured elastomer with high compression set occurring with elastomers of low cross-linked density in the state of cure. Heat treatment, in accordance with the practice of this invention, appears to increase cross-linked density with corresponding reduction in compression set without change in composition of the cured or vulcanized rubber. Treatment, in accordance with the practice of this invention, is also believed to cause some polysulfide cross-links to become monosulfide links or shorter polysulfide links.

The invention will hereinafter be illustrated by reference to the following examples which are given by way of illustration, but not by way of limitation.

The elastomeric polymers of the various examples were compounded in the following standard recipe:

| Ingredient: | Parts by weight |
|---|---|
| Polymer | 100 |
| ISAF Black | 80 |
| Petroleum derivative plasticizer (Circosol 4240—Sun Oil Company) | 55 |
| Zinc oxide | 5 |
| Stearic acid | 1 |
| Mercaptobenzothiazole | 0.75 |
| Tetramethyl thiuram monosulfide | 1.5 |
| Sulfur | 1.5 |

Compression set was determined by the standard ASTM test at 158° F. for 22 hours and/or at 212° F. for 22 hours, as indicated in the respective examples.

EXAMPLES 1 to 11

| Ex. | Polymer trade name | Third Monomer | C=C/ 1,000 carbon atoms | Mooney |
|---|---|---|---|---|
| 1 | Royalene 301 | Dicyclopentadiene | 4.2 | 28 |
| 2 | Enjay 4504 | 5-methylene-2-norbornene | 4.0 | 28 |
| 3 | Nordel 1440 | 1,4-hexadiene | 6.5 | 40 |
| 4 | Enjay 477A | Ethylidene-2-norbornene | 3.5 | 54 |
| 5 | Enjay 3509 | Methylene-2-norbornene | 3.5 | 66 |
| 6 | Royalene 502 | Ethylidene-2-norbornene | 5.0 | 55 |
| 7 | Nordel 1470 | 1,4-hexadiene | 6.5 | 70 |
| 8 | Epsyn 40 | Ethylidene-2-norbornene | 2.7 | 40 |
| 9 | Epsyn 70 | do | 2.7 | 70 |
| 10 | Epsyn 40A | do | 5.0 | 40 |
| 11 | Epsyn 55 | do | 9.0 | 55 |

Compression set buttons were molded at 320° F. for 30 minutes. Heat treatment was carried out at the following temperatures and times:

70 hours at 158° F.
24 hours at 212° F.
48 hours at 212° F.
72 hours at 212° F.
24 hours at 250° F.
48 hours at 250° F.
72 hours at 250° F.

The results, which are illustrated in FIG. 1, indicate that marked reductions in compression set of the molded compounds is achieved after heat treatment for 72 hours at 212° F. and after 24 hours at 250° F. with little if any additional benefit being derived by heat treatment for more than 72 hours at 250° F.

It will also be noted that lowest values of compression set occur with polymers having the higher number of C=C groups per 1000 carbon atoms with the greatest reduction percentagewise being achieved with polymers which originally have higher compression set values. In any event, reductions ranging from 50% and more are achieved by post heat treatment of the molded polymer in accordance with the practice of this invention.

EXAMPLES 12 to 15

Compression set tests were performed on the following polymers of ethylene, propylene and 5-ethylidene-2-norbornene:

Epsyn 40 (40 Mooney, 2.7 C=C/1000 C)
Epsyn 40A (40 Mooney, 5.0 C=C/1000 C)
Epsyn 70 (70 Mooney, 2.7 C=C/1000 C)
Epsyn 70A (70 Mooney, 5.0 C=C/1000 C)

Compression set test buttons were molded at 320° F. for 10 minutes and for 30 minutes. Heat treatment at 275° F. and 300° F. were applied at various times ranging from 2 to 24 hours with the results set forth in the following Tables I to VIII.

TABLE I

Aging Temperature 275° F.—Epsyn 70 Polymer

| Cured at 320° F. | | 10' cures | 30' cures |
|---|---|---|---|
| Compression set 22 hours at— | | | |
| 158° F. | Normal [1] | 66.4 | Normal [1] 37.0 |
| | 2 hours | 23.6 | 2 hours 21.7 |
| | 4 hours | 18.9 | 4 hours 24.1 |
| | 8 hours | 17.9 | 8 hours 18.5 |
| | 12 hours | 19.4 | 12 hours 20.4 |
| | 18 hours | 17.0 | 18 hours 19.1 |
| | 24 hours | 24.1 | 24 hours 21.0 |
| 212° F. | Normal [1] | 89.9 | Normal [1] 69.7 |
| | 2 hours | 53.9 | 2 hours 47.9 |
| | 4 hours | 45.7 | 4 hours 45.5 |
| | 8 hours | 37.9 | 8 hours 33.3 |
| | 12 hours | 31.2 | 12 hours 28.8 |
| | 18 hours | 28.6 | 18 hours 27.2 |
| | 24 hours | 25.8 | 24 hours 27.6 |

[1] Unaged.

TABLE II

Aging Temperature 275° F.—Polymer 70A

| Cured at 320° F | 10' Cures | 30' Cures |
|---|---|---|
| Compression set 22 hours at— | | |
| 158° F | Normal[1] 43.6<br>2 hours 14.7<br>4 hours 13.8<br>8 hours 10.9<br>12 hours 11.2<br>18 hours 10.8<br>24 hours 11.8 | Normal[1] 20.0<br>2 hours 12.3<br>4 hours 13.2<br>8 hours 10.7<br>12 hours 10.9<br>18 hours 11.7<br>24 hours 12.1 |
| 212° F | Normal[1] 81.0<br>2 hours 30.1<br>4 hours 21.8<br>8 hours 19.1<br>12 hours 17.3<br>24 hours 14.6 | Normal[1] 49.2<br>2 hours 25.0<br>4 hours 21.2<br>8 hours 18.3<br>12 hours 13.2<br>24 hours 14.1 |

[1] Unaged.

TABLE III

Aging Temperature 275° F.—Polymer EPsyn 40

| Cured at 320° F | 10' Cures | 30' Cures |
|---|---|---|
| Compression set 22 hours at— | | |
| 158° F | Normal[1] 50.0<br>2 hours 22.6<br>4 hours 21.2<br>8 hours 14.5<br>12 hours 16.6<br>18 hours 17.2<br>24 hours 17.0 | Normal[1] 30.2<br>2 hours 19.4<br>4 hours 22.1<br>8 hours 15.4<br>12 hours 16.1<br>18 hours 17.7<br>24 hours 18.1 |
| 212° F | Normal[1] 86.4<br>2 hours 52.0<br>4 hours 40.7<br>8 hours 30.8<br>12 hours 25.6<br>18 hours 23.5<br>24 hours 22.1 | Normal[1] 61.7<br>2 hours 39.0<br>4 hours 34.4<br>8 hours 27.8<br>12 hours 25.7<br>18 hours 22.9<br>24 hours 21.5 |

[1] Unaged.

TABLE IV

Aging Temperature 275° F.—Polymer EPsyn 40A

| Cured at 320° F | 10' Cures | 30' Cures |
|---|---|---|
| Compression set 22 hours at— | | |
| 158° F | Normal[1] 45.8<br>2 hours 12.4<br>4 hours 14.5<br>8 hours 9.8<br>12 hours 12.5<br>18 hours 11.9<br>24 hours 10.8 | Normal[1] 18.5<br>2 hours 12.0<br>4 hours 13.6<br>8 hours 10.6<br>12 hours 13.0<br>18 hours 11.5<br>24 hours 10.9 |
| 212° F | Normal[1] 75.2<br>2 hours 28.8<br>4 hours 20.1<br>8 hours 19.1<br>12 hours 16.8<br>18 hours 14.8<br>24 hours 14.0 | Normal[1] 31.5<br>2 hours 23.0<br>4 hours 19.2<br>8 hours 17.2<br>12 hours 14.4<br>18 hours 13.5<br>24 hours 13.2 |

[1] Unaged.

TABLE V

Aging Temperature 300° F.—Polymer EPsyn 70

| Cured at 320° F | 10' Cures | 30' Cures |
|---|---|---|
| Compression set 22 hours at— | | |
| 158° F | Normal[1] 66.4<br>2 hours 28.3<br>4 hours 24.1<br>8 hours 21.3<br>12 hours 2.22<br>18 hours 20.5<br>24 hours 22.1 | Normal[1] 37.0<br>2 hours 24.3<br>4 hours 22.3<br>8 hours 21.7<br>12 hours 23.3<br>18 hours 23.5<br>24 hours 22.7 |
| 212° F | Normal[1] 89.9<br>2 hours 62.6<br>4 hours 47.0<br>8 hours 28.2<br>12 hours 27.8<br>18 hours 33.1<br>24 hours 36.8 | Normal[1] 69.7<br>2 hours 49.1<br>4 hours 39.7<br>8 hours 28.9<br>12 hours 26.9<br>18 hours 33.0<br>24 hours 34.7 |

[1] Unaged.

TABLE VI

Aging temperature 300° F.—Polymer EPsyn 70A

| Cured at 320° F | 10' Cures | 30' Cures |
|---|---|---|
| Compression set 22 hours at— | | |
| 158° F | Normal[1] 43.6<br>2 hours 15.3<br>4 hours 13.0<br>8 hours 11.2<br>12 hours 11.1<br>18 hours 12.0<br>24 hours 12.1 | Normal[1] 20.0<br>2 hours 13.1<br>4 hours 12.0<br>8 hours 11.8<br>12 hours 13.0<br>18 hours 12.6<br>24 hours 12.9 |
| 212° F | Normal[1] 81.0<br>2 hours 32.0<br>4 hours 21.6<br>8 hours 16.6<br>12 hours 15.5<br>18 hours 18.8<br>24 hours 20.8 | Normal[1] 49.2<br>2 hours 22.9<br>4 hours 18.4<br>8 hours 14.5<br>12 hours 13.8<br>18 hours 19.1<br>24 hours 20.0 |

[1] Unaged

TABLE VII

Aging temperature 300° F.—Polymer EPsyn 40

| Cured at 320° F | 10' Cures | 30' Cures |
|---|---|---|
| Compression set 22 hours at— | | |
| 158° F | Normal[1] 50.0<br>2 hours 23.4<br>4 hours 18.0<br>8 hours 16.2<br>12 hours 18.3<br>18 hours 18.1<br>24 hours 17.5 | Normal[1] 30.2<br>2 hours 18.3<br>4 hours 18.9<br>8 hours 17.9<br>12 hours 19.1<br>18 hours 18.9<br>24 hours 19.7 |
| 212° F | Normal[1] 86.4<br>2 hours 52.4<br>4 hours 36.7<br>8 hours 24.1<br>12 hours 23.1<br>18 hours 27.3<br>24 hours 29.8 | Normal[1] 61.7<br>2 hours 39.0<br>4 hours 30.1<br>8 hours 23.2<br>12 hours 22.0<br>18 hours 27.4<br>24 hours 28.6 |

[1] Unaged.

TABLE VIII

Aging temperature 300° F.—Polymer EPsyn 40A

| Cured at 320° F | 10' Cures | 30' Cures |
|---|---|---|
| Compression set 22 hours at— | | |
| 158° F | Normal[1] 45.8<br>2 hours 14.3<br>4 hours 12.4<br>8 hours 11.9<br>12 hours 12.3<br>18 hours 12.0<br>24 hours 12.4 | Normal[1] 18.5<br>2 hours 14.0<br>4 hours 11.9<br>8 hours 12.4<br>12 hours 12.8<br>18 hours 12.3<br>24 hours 12.5 |
| 212° F | Normal[1] 75.2<br>2 hours 27.1<br>4 hours 24.4<br>8 hours 14.9<br>12 hours 14.8<br>18 hours 17.2<br>24 hours 19.9 | Normal[1] 31.5<br>2 hours 19.8<br>4 hours 16.1<br>8 hours 14.3<br>12 hours 13.4<br>18 hours 17.9<br>24 hours 20.1 |

[1] Unaged.

It will be seen that after 2 hours post heat treatment at either 275° F. or 300° F., compression set is reduced materially from the levels of the cured but untreated polymers. No significant improvement in compression set is secured after 24 hours of heat treatment and best results are secured within the range of 2 to 12 hours of heat treatment. It will also be noted that compression set varies somewhat with cure time but that such differences level out with the heat treatment.

EXAMPLES 16 to 19

The same compounds were tested as in Examples 12 to 15 with heat treatment to reduce compression set at temperatures of 350° F. and 400° F. for times ranging from 0 to 12 hours. The following results were secured:

TABLE IX

Aging temperature 350° F.

| | Compression set, 22 hours at— | |
|---|---|---|
| | 158° F. | 212° F. |
| Cured 30' at 320° F.: | | |
| EPsyn 70—Hours aged: | | |
| 0 | 24.0 | 56.9 |
| 1 | 16.0 | 29.0 |
| 2 | 18.7 | 23.2 |
| 4 | 21.0 | 25.3 |
| 8 | 24.6 | 24.7 |
| 12 | 17.4 | 42.2 |
| EPsyn 70A—Hours aged: | | |
| 0 | 14.5 | 38.3 |
| 1 | 10.9 | 18.7 |
| 2 | 13.9 | 15.8 |
| 4 | 14.7 | 17.4 |
| 8 | 16.4 | 17.8 |
| 12 | 10.6 | 18.6 |
| EPsyn 40—Hours aged: | | |
| 0 | 24.0 | 53.7 |
| 1 | 18.3 | 28.1 |
| 2 | 17.7 | 23.7 |
| 4 | 19.0 | 25.1 |
| 8 | 25.4 | 23.4 |
| 12 | 19.9 | 25.5 |
| EPsyn 40A—Hours aged: | | |
| 0 | 17.5 | 40.7 |
| 1 | 13.0 | 21.3 |
| 2 | 15.1 | 19.8 |
| 4 | 13.3 | 20.5 |
| 8 | 21.6 | 19.1 |
| 12 | 14.4 | 18.4 |

TABLE X

Aging temperature 400° F.

| | Compression set, 22 hours at— | |
|---|---|---|
| | 158° F. | 212° F. |
| Cured 30' at 320° F.: | | |
| EPsyn 70—Hours aged: | | |
| 0 | 24.0 | 56.9 |
| 1 | 28.0 | 25.8 |
| 2 | 26.6 | 26.0 |
| 4 | 30.4 | 26.5 |
| 8 | 26.7 | 27.8 |
| 12 | 30.7 | 31.6 |
| EPsyn 70A—Hours aged: | | |
| 0 | 14.5 | 38.3 |
| 1 | 18.1 | 18.7 |
| 2 | 16.9 | 19.2 |
| 4 | 20.3 | 19.6 |
| 8 | 20.8 | 22.4 |
| 12 | 25.6 | 24.2 |
| EPsyn 40—Hours aged: | | |
| 0 | 24.0 | 53.7 |
| 1 | 26.5 | 22.9 |
| 2 | 24.1 | 21.9 |
| 4 | 28.4 | 24.1 |
| 8 | 30.5 | 26.8 |
| 12 | 33.2 | 27.5 |
| EPsyn 40A—Hours aged: | | |
| 0 | 17.5 | 40.7 |
| 1 | 26.6 | 23.3 |
| 2 | 25.4 | 20.8 |
| 4 | 25.9 | 24.4 |
| 8 | 30.1 | 27.1 |
| 12 | 30.3 | 27.8 |

At these higher temperatures of heat treatment, marked reductions in compression set are achieved after one hour with little improvement being secured after two to four hours of heat treatment.

It will be apparent from the foregoing that there is provided a means for improving compression set of sulfur curable polymers and particularly EPDM type polymers whereby the compression set is reduced to desirable levels.

It will be understood that changes may be made in the details of formulation and operation without departing from the spirit of the invention, especially as defined in the following claims.

I claim:

1. The method for reducing compression set of cured or vulcanized elastomeric compositions comprising post-treating the cured or vulcanized material by heating the cured or vulcanized elastomer to a temperature within the range of 200° to 400° F. for a time within the range of at least 72 hours at 200° F. to at least 1 hour at 400° F. with the minimum time of 72 hours to 1 hour varying with the post-treatment temperature within the range of 200° to 400° F.

2. The method as claimed in claim 1 in which the curable elastomeric material is an EPDM elastomer.

3. The method as claimed in claim 2 in which the EPDM elastomer has an initial level of unsaturation of at least 5 C=C groups per 1000 carbon atoms before cure.

4. The method as claimed in claim 1 in which the cured elastomeric product is heated for at least 72 hours at a temperature of about 212° F.

5. The method as claimed in claim 1 in which the cured elastomeric product is heated for at least 24 hours at a temperature of about 250° F.

6. The method as claimed in claim 1 in which the cured elastomeric product is heated for at least 4 hours at a temperature of about 250° to 300° F.

7. The method as claimed in claim 1 in which the cured elastomeric product is heated for at least 1 to 2 hours at a temperature of about 350° F.

8. The method as claimed in claim 1 in which the cured elastomeric product is heated for at least 1 hour at a temperature of about 400° F.

References Cited

UNITED STATES PATENTS

| 3,203,937 | 8/1965 | Breslow et al. | 260—79.3 |
| 3,285,883 | 11/1966 | Shepherd | 260—79.5 |
| 3,285,885 | 11/1966 | Shepherd et al. | 260—79.5 |
| 3,461,105 | 8/1969 | Anderson | 260—75 |
| 3,502,641 | 3/1970 | Harrison et al. | 260—94.9 G |

JOSEPH L. SCHOFER, Primary Examiner

R. A. GAITHER, Assistant Examiner

U.S. Cl. X.R.

260—79.5, 88.2 S